United States Patent
Pomerantz

[19]

[11] Patent Number: 6,071,583

[45] Date of Patent: Jun. 6, 2000

[54] REMOVABLE DOUBLE-FACED ADHESIVE TAB

[76] Inventor: Carl Pomerantz, 567 Lakeshore Blvd., Beaconfields, Montreal, Que., Canada, H9W4K3

[21] Appl. No.: 08/993,304

[22] Filed: Dec. 18, 1997

[51] Int. Cl.$^7$ .................................................. C09J 7/02
[52] U.S. Cl. .................... 428/40.1; 24/67 AR; 428/41.8; 428/41.9; 428/42.1; 428/192; 428/194; 428/202; 428/203; 428/220
[58] Field of Search ................. 428/40.1, 41.8, 428/42.1, 41.9, 194, 202, 203, 220, 192; 24/67 AR

[56] References Cited

U.S. PATENT DOCUMENTS

| | | | |
|---|---|---|---|
| 2,030,135 | 2/1936 | Carpenter | 428/40.1 |
| 3,257,677 | 6/1966 | Batchelder | 206/460 |
| 3,869,333 | 3/1975 | McMaster | 428/194 |
| 5,202,169 | 4/1993 | Spendlove | 428/194 |
| 5,876,817 | 3/1999 | Mathna | 428/40.1 |

FOREIGN PATENT DOCUMENTS

| | | |
|---|---|---|
| 2113756 | 1/1994 | Canada . |
| 2168370 | 8/1994 | Canada . |

*Primary Examiner*—Nasser Ahmad
*Attorney, Agent, or Firm*—Mila Shuartsman

[57] ABSTRACT

The present invention relates to a removable double-sided adhesive tab comprising a tab body of substantially flat thin configuration. Each side of the tab is divided into a coated portion coated by an adhesive composition and an uncoated portion. The tab is adapted to be removably fixed to a supporting surface by means of one side and the other side is provided to be stuck to a display object. The uncoated portion has at least one grip element; this grip element is provided to facilitate easy gripping and peeling off the tab from the supporting surface, and a liftabilty effect is achieved no matter which side of the tab is placed against the supporting surface. The grip element comprises a crimp forming a localized surface deformity which causes the uncoated portion of the tab body to be slightly out of plane surface in the vicinity of the crimp. The thickness of the tab body is between 0.002 and 0.02 inches, and it can be made of either semi-rigid or rigid plastic material. Each of the coated portions is covered by a removable protective liner, and wherein the removable protective liner extends into the uncoated portion. The coated portion on one of the sides counter-opposes the coated portion of the other of the sides, or counter-opposes the uncoated portion of the other of the sides, and wherein each distal end of the tab body is provided with the grip element.

18 Claims, 2 Drawing Sheets

REMOVABLE DOUBLE-FACED ADHESIVE TAB

The present invention is related to adhesive tabs, and more particularly to a removable double-faced adhesive tab to be fixed to a supporting surface for use with display objects, such as signage or the like.

In the retail environment, it is often desired to attach temporary paper signage indicating "special sale price" or the like onto fixturing, or onto the products themselves. As well, framed signs, flags, paper posters or balloons or flexible vinyl banners and promotions are often placed in prominent locations to highlight promotions or sale events. In the trade, this is referred to as Point of Purchase signage (P.O.P.) and is typically featured for a limited time promotional sale event (1 to 3 weeks), at the end of which it is discarded. As this signage is temporary in nature, it is desirable and cost effective to use thin, inexpensive signage materials as this signage only requires limited strength and durability. A wide variety of materials are commonly used with varying strength and structural characteristics. It is therefore very beneficial if an attachment means were available that was versatile enough to be universally effective for attaching a broad range of P.O.P. signage materials to a wide variety of fixed surfaces with varying configurations. In addition, the attachment means must be able to have sufficient strength to bond the signage to the fixture or other desired surface, yet be easily, quickly removable with a low level of skill or dexterity requirement. As well, the attachment means must be aesthetically inconspicuous.

Because this P.O.P. signage has a strong effect on consumer behaviour, in addition to the signage itself, it is desirable and advantageous if its attachment means are aesthetically pleasing, and do not in any way distract or detract from the impact of the signage on the consumer. It is therefore advantageous if the signage has an entirely inconspicuous means of adhering onto the fixed surface.

Operationally, it is also important that the means of attaching this P.O.P. signage be cost-effective, expedient to go up and be able to come down quickly and neatly so that in-store labour is minimized, and versatile as there are many different display situations in a given store. It is also critical that once the signage is removed, the fixtures are not damaged or marred in any way. In a typical store, each individual department puts up and takes down its own signage, so that the attachment, detachment and clean up are all done by a broad cross-section of personnel with varying and sometimes limited degrees of training and manual dexterity. It is not unusual for it to be done by part-time employees.

For standard, recurring applications, there exist many mechanical clips that are employed for attachment of this P.O.P. signage onto store fixturing and other fixed surfaces. For example, U.S. Pat. Nos. 4,557,064 and 4,995,182 describe devices which can be used to attach paper signage onto fixturing. Likewise, there exist various clamps in combination with suction cups for attaching promotional posters and banners onto windows. These devices are relatively costly and are economical only if they can be reused. When in use, they have the drawback of the holding means being visible and conspicuous to the consumer, thereby distracting and therefore somewhat diminishing and diluting the impact and message in the signage on the consumer.

As well, their design necessitates that they be customized for each specific fixturing configuration. However, in a retail environment, although there may be consistency throughout the shelving in a store, there are many diverse surfaces onto which it is desirable to be able to attach signage or promotional materials. For example, in addition to shelf edges, there are clothing racks, skidded and boxed merchandise, sample floor model merchandise on the retailer's floor, on peg-hooked areas, various counter edges, glass windows, walls, the sides of shelving. In order to be able to attach signage and promotional materials using clips as attachment means across these diverse surfaces, it would be necessary for the retailer to purchase and stock a different clip or attachment means for each situation. Stocking such a variety of attachment means would be impractical and logistically impossible to track and organize effectively, especially because these attachment means would have to be shared across many personnel in many parts of the store.

Frequently, transparent one-sided adhesive tape is almost universally used to stick this P.O.P. signage in place. Although the tape is transparent, it is difficult and labour intensive to make this attachment in a consistently neat fashion. As a result, the tape's visible, conspicuous and unsightly nature weakens the visual impact of the signage on the consumer. Therefore, the sign's message is impaired. In an effort to render the tape less conspicuous, experienced store personnel will sometimes curl a short (2–3 inches) length of tape onto itself thereby forming a loop with the adhesive surface on the outside of the loop; they will then place this loop between the P.O.P. material and the fixed surface, thereby adhering the two together. Although this does achieve a less conspicuous attachment of the P.O.P. material to the fixed surface, it is labour intensive and time consuming to achieve; also, it requires significant manual dexterity, and the two surface do not hold tightly together. The result is that the signage ends up sagging or crooked, and looking somewhat sloppy; as before, this inferior method dilutes the impact of the signage message on the consumer.

One-sided adhesive tape has drawbacks not only when the P.O.P. materials are in place, but also presents inherent problems when the materials are taken down. Quite typically, the tape tears and adheres to the fixture, and considerable manual labour and dexterity are required in order to remove the remaining torn tape from the fixture. Usually store personnel are too busy to do this, and as a result there is unsightly messy tape residues and remains left marring the fixtures. In an effort to combat this unsightliness, retailers periodically must use cleaning solvents to clean and remove the tape remnants. Again, this is costly and time consuming to do.

In an effort to enhance P.O.P. signage attachment means, paper and flexible vinyl P.O.P. signage sometimes are manufactured with a self-contained pressure sensitive adhesive portion or strip on the back of the signage, covered with a release liner. At store level, the adhesive is exposed and the signage is mounted in the desired location. In the case of paper signage, the inclusion of the pressure sensitive portion substantially increases the cost of manufacture of the signage, and its use is further limited as the signage containing the adhesive strip cannot pass through an on-sight store laser printer for sign customizing at store level. As well, the adhesive must be strong enough to ensure that the signage stays firmly in place throughout the promotional event even if it is knocked or slightly disturbed or brushed against by customers. It is also critical that the signage be quickly and cleanly removable from fixturing at the end of the promotional event. If inexpensive paper fibre is used, adhesive and paper fibre will get transferred onto fixturing when the signage is taken down. This leaves store fixturing unsightly and requires labour intensive cleaning to remove this adhesive and paper fibre residue. As a result, the paper fibre materials used for manufacture of the P.O.P. signage must be upgraded for strength and durability to ensure that when the signage is removed, there is no transfer of adhesive and fibre onto the fixturing. This adds substantially to the cost of this P.O.P. signage and renders it useful in only a limited number of cases.

In the case of larger P.O.P. signage such as flexible vinyl banners, these can also be manufactured to include a self contained pressure sensitive adhesive strip on the back of the signage. At store level, the adhesive is exposed and the signage is mounted in the desired location. However, in addition to significantly increasing the cost of manufacture of the signage, it requires significant skill to successfully manipulate and mount the signage in place once the adhesive is exposed. This operation requires skills similar to the skills required to successfully apply wallpaper onto a wall. It is much easier, faster and less skill intensive to apply adhesive onto the fixed surface, and then apply the banner. The present invention allows this to be done.

There are commercially available double sided tapes which are relatively inexpensive to manufacture. However, using these tapes for P.O.P. signage poses several difficulties. If a section of tape is cut and the liner removed, it is difficult to manipulate because of its sticky, non-rigid nature. However, if a section is cut and the liner is not removed, the sticky face can be adhered to a first surface, for example the back of paper P.O.P. signage, and then the liner can be removed and the paper signage adhered to a fixed surface. However, difficulties arise when the signage is to be removed, as the adhesive may tend to adhere to the fixed surface and substantial labour and skill is required to remove the adhesive and shredded paper from the fixed surface because there is no means to easily grip and remove the adhesive from the surface.

There are also commercially available double-sided foam tape tabs. Because of the relative thickness of material used (typically 30–50 thousandths of an inch) the non-adhesive free end is relatively easy to grip for removal from a flat fixed surface. However, as the P.O.P. signage materials are typically very thin due to their temporary life expectancy, the use of foam of this thickness as an attachment means creates a visible bump on the signage which is aesthetically undesirable and distracting. As well, because there is a gap between the P.O.P. signage and flat fixed surface, the signage does not sit flush and is more prone to being slightly cockeyed or crooked. It is for these reasons that foams are not suitable and are of limited use for these P.O.P. applications if compared to the present invention. [environmental point of view?]

In an effort to overcome foam's shortfalls due to thickness, Canadian patent application 2,113,756 describes a double-sided tape which can be dispensed and can include one or two sides with repositionable adhesive. If one face is repositionable and the other is not, it is difficult to ensure that retail personnel will consistently differentiate between the two faces correctly. If they confuse the two faces, the result may be that the signage does not hang dependably, or at the end of the event, it does not release properly. Even if the two sides are colour-coded, it is unrealistic to expect that all personnel will adhere to this colour scheme given the number of personnel who are involved in these procedures. If both sides featured a more aggressive adhesive, again difficulties arise when the signage is removed, as the adhesive may tend to adhere to the fixed surface and substantial labour and skill will be required to remove the adhesive and shredded paper from the fixed surface, as there is no means to easily grip and remove the adhesive from the surface.

The present invention eliminates all above disadvantages and provides a cost effective, efficient and simple structure which allows to facilitate fast fixing of the display objects without having all undesirable side effects of the known means.

The tab features an aggressive adhesive on both faces so that when the signage (typically fabricated from weak materials for best cost effectiveness) is taken down, the signage tends to shred or tear in the area on and around the adhesive face of the tab, while the tab itself remains stuck to the fixture via the opposing adhesive face.

At this point in the removal process, if the tab were perfectly flat, significant manual dexterity would be required to then lift the free edge of the tab away from the flat fixed surface for removal. For example, if personnel did not have a fingernail to initially get under the edge of the tab, they would have difficulty raising the edge of the tab.

In the past, in order to overcome this "liftability" problem manufacturers would construct the entire tab of a thicker material such as the foam tabs described previously; however, as mentioned earlier, thicker material has inherent operational and aesthetic shortfalls. Alternatively, the manufacturers would be forced to use less aggressive adhesives so that removal would be easier. However, it is often desirable to use more aggressive adhesives to ensure that the signage does not prematurely fall off the fixture before the promotional event is over.

BRIEF DESCRIPTION OF DRAWINGS

The invention is better understood by reading the following Detailed Description of the Preferred embodiments with reference to the accompanying drawing figures, in which like reference numerals refer to like elements throughout, and in which.

DETAILED DESCRIPTION OF THE PRESENT INVENTION

Figure 1:
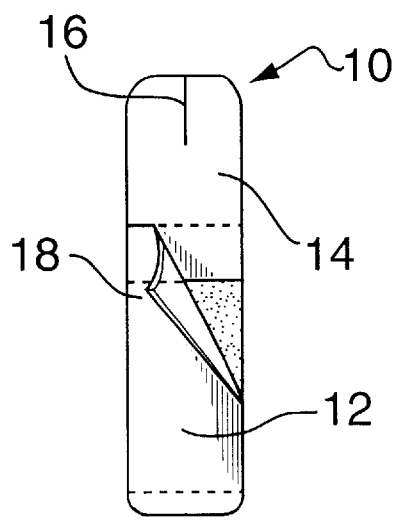
FIG. 1 is a front view of the two sided adhesive tab according to the first embodiment of the present invention.
Figure 2:
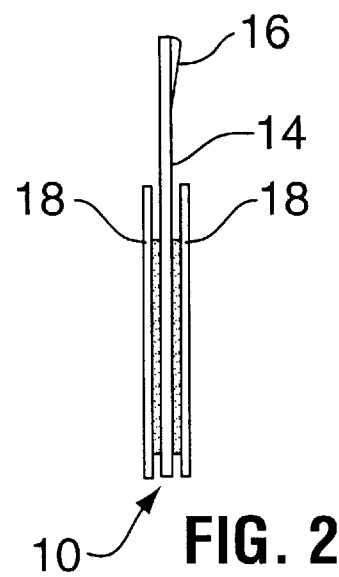
FIG. 2 is a side view of the two-sided adhesive tab of FIG. 1.
Figure 3:
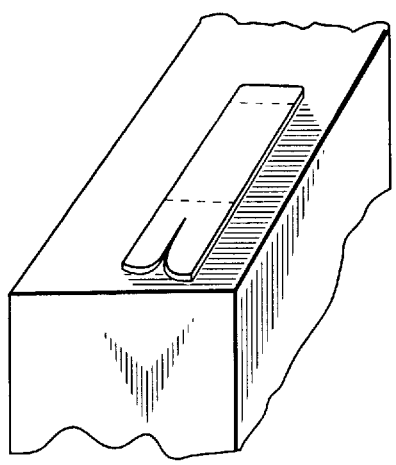
FIG. 3 is a perspective view of the distal end of the adhesive tab of FIG. 1.
Figure 4:
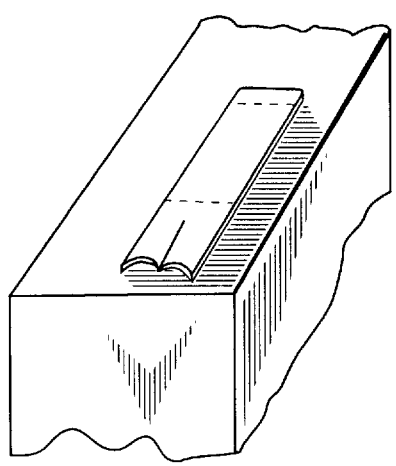
FIG. 4 is a perspective view of the distal end of the two-sided adhesive tab of FIG. 1, with the opposite face on the fixed surface.

Referring to the drawings, FIG. 1 shows a two-sided adhesive tab 10 of the first embodiment of the present invention. There are adhesive portions 12 and uncoated portions 14 on either side of the tab 10. The coated portions 12 are coated by an adhesive composition and are covered by a removable release liner 18 to expose the adhesive when desired. For convenience, the release liner 18 can overhang the adhesive portion to ease in lifting and peeling the liner, as illustrated in the side view of FIG. 2. The distal end of the uncoated portion 14 is provided with a localized crimp or dimple 16 rendering this end slightly out of plane when the tab 10 is place adjacent to a rigid planar surface. FIGS. 3 and 4 illustrate the effect this localized crimp 16 has so that the distal end can be easily lifted with a finger tip for removal of the tab from the flat surface when desired. The localized crimp 16 is such that the liftability of the distal edge off the flat surface is achieved no matter which face of the tab is placed against the flat surface; this is a very important feature of the present invention.

Tab 10 is made of rigid or semi-rigid plastic material. Suggested thickness if such material is between 0.002 to 0.02 inches.

Figure 5:
FIG. 5 is a perspective view of the two-sided adhesive tab in use, adhering paper signage to a shelf edge.

FIG. 5 illustrates typical Point of Purchase signage held in place by the present invention. During use, the actual tab is hidden behind the signage, and the localized crimp is small enough so that it does not in any way deform or deface the front of the signage, even if signage is constructed of thin paper fibres or polyethylene.

Figure 6:
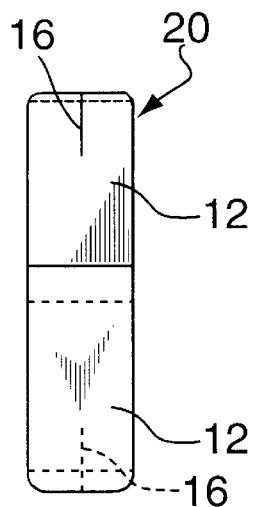
FIG. 6 is a second embodiment of the present invention wherein the adhesive zones are at opposite ends on each opposing face.
Figure 7:
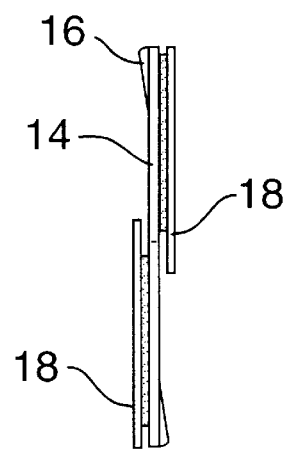
FIG. 7 is a side view of FIG. 6.
Figure 8:
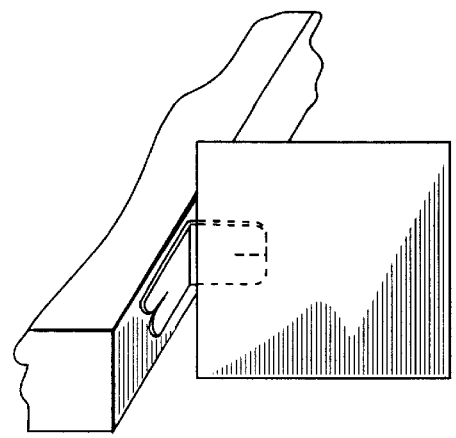
FIG. 8 shows a perspective view of the tab depicted in FIG. 6 bent at 90°.

FIG. 6 shows a tab 20 according to a second embodiment of the present invention wherein the adhesive zones 12 illustrated are formed at opposite ends on each opposing face. In this embodiment each distal end of uncoated portion 14 is provided with a crimp 16. With this embodiment, this tab 20 can be use in similar fashion to the earlier embodiment previously described, or it can be use to place signage perpendicular to the flat fixed surface, by bending the tab 90 degrees about line A—A, as illustrated in FIG. 8. In this configuration, the body of the tab must be constructed from material of sufficient rigidity to maintain this bending deformation.

Figure 9:
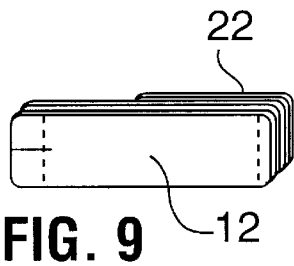
FIG. 9 shows a third embodiment of the present invention where the size and placement of adhesive zones differ on each face.
Figure 10:
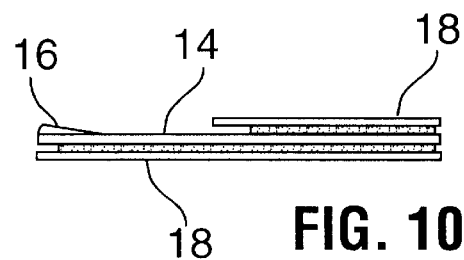
FIG. 10 shows a side view of FIG. 9.

FIGS. 9 and 10 show a tab 22 according to a third embodiment of the present invention, wherein one face consists of a coated portion 12 and an uncoated portion 14, while the opposing face is substantially coated across the entire face. This configuration would be desirable for example if the paper signage were made of particularly weak fibres so that increased surface area for contact with adhesive were desired on the side of the tab in contact with the paper, while less adhesive would be desired on the side of the tab in contact with the fixture. As well, upon removal of the paper signage, the paper would shred and the tab 22 would remain stuck to the fixture. At that point, due to the edge deformation, the tab distal edge could be easily lifted by means of the crimp 16 and then removed from the face of the fixture.

Figure 11:
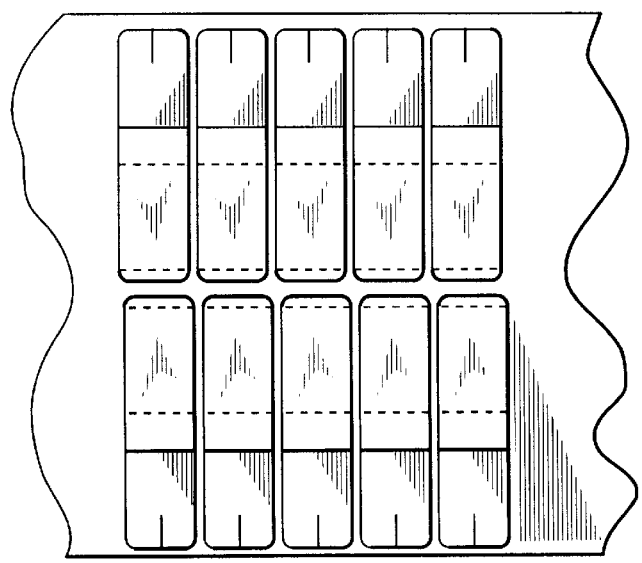
FIG. 11 shows the present invention formatted on a common liner sheet.

The format of the tabs can be such that each tab is an individual piece. Alternatively, as it shown on FIG. 11, the parts can be produced such that the tabs are die cut onto a sheet or roll with one common release liner on one face. It is also possible to produce the invention so that in final sheet or roll format, both faces each have a common release liner with different release coefficients so that removal of one liner exposes an array of tabs for faster removal and placement. This type of arrangement is very advantageous in case the store employee has to use a lot of tabs on the same location without a necessity to remove a paper liner from each individual tab.

Figure 12:
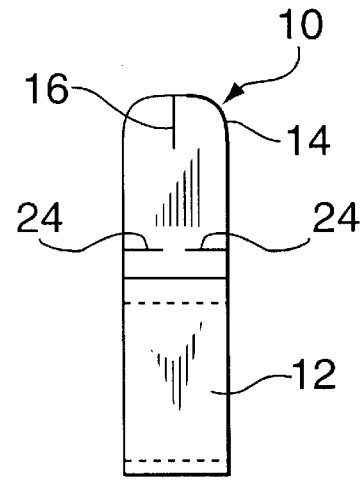
FIG. 12 shows the present invention of FIG. 1 provided with side crimps.

FIG. 12 shows a modification of tab 10 of FIG. 1, wherein crimp or distortion 24 are formed along any side edges of the uncoated portion 14 which allows to lift and grip the uncoated portion 14 from the side. Thus, the present invention is not restricted to the gripping element to be formed at the distal end of the tab, but also to any other place along the edges of uncoated portion 14.

However, with the present invention, because of the localised crimp along the non-adhesive edge of the tab, the edge can be quickly and easily gripped at its non-adhesive end (with a minimal degree of manual dexterity), peeled off the fixture or fixed surface and discarded. The crimp is such that this liftability characteristic of the edge is achieved regardless of which face of the tab is applied to the fixed surface. This eliminates the possibility of user error when applying the tabs. The crimp serves both to facilitate edge lift, as well as increasing surface roughness in the grip area so aggressive adhesives can be used and the tab can still be removed from fixed surfaces with minimal manual dexterity required. The crimp/surface deformation is localized and of such shape that it is imperceptible when the P.O.P. signage is viewed from the front.

The method of forming of the deformity or gripping element can be accomplished by several methods. In one case the edge is subjected to a localized heat treatment during the manufacture, so that upon cooling shrinkage occurs rendering the edge slightly out of plane. In another method the material is runned under a dull die cutting blade that does not transcent the material. This creates crushing stresses in the material under the dulled blade and its direct vicinity. These stresses create a planar distortions along the plastic surface which can be incorporated along the edge of the final tab.

Typical use of the present invention as an attachment means for P.O.P. signage would be as follows:

A) the release liner on one face of the tab is removed and discarded,

B) the tab is stuck onto the fixture or fixed surface,

C) the release liner on the second face is removed, and

D) the signage can then be adhered onto the exposed adhesive face on the fixed surface.

As well, the sequence can be reversed as follows:

A) the release liner on one face of the tab is removed and discarded,

B) the tab is stuck onto the back of the signage,

C) the release liner on the second face removed and discarded, and

D) the signage can then be adhered onto the fixed surface.

Alternatively, the above two sequences can be A, C, B, D.

The invention therefore achieves the desired, inconspicuous/invisible means of support of the P.O.P. signage material, so that the signage is aesthetically pleasing and its message is undiluted. It is easy and quick to apply and remove and there is no danger of incorrect application as it works equally well no matter which face is placed against the fixed surface. Even if the more desirable aggressive adhesives are used, the tab is quick and easy to remove from a fixed surface because of its crimp, and requires a minimal degree of manual dexterity or instruction to be used effectively.

Economies of manufacture are achieved by using a relatively thin substrate such as synthetic mouldable resins Eke PVC, PETG or polyethylene. Pressure sensitive tape, covered with a release liner, can be applied to the two faces of the substrate prior to crimping and cutting out the appropriate tab shapes. The material surface characteristics of these substrate can be economically selected during manufacture so that when the tab is in use and then removed from the fixed surface, the adhesive is more strongly attracted to the substrate than the fixed surface (Typically metal, glass or wood) so little adhesive residue is left on the fixed surface.

There are many other situations aside from retail P.O.P. signage where the present invention can be beneficially employed. For example, young children and the elderly have limited manual dexterity and therefore have difficulty manipulating adhesive tape, especially removing it off of surfaces. For example, in the home this demographic group may desire to temporarily place pictures, drawings, or decorations on their windows. Again, aesthetically pleasing placement and removal are facilitated by the features described, even if the adhesive used is relatively aggressive.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

What is claimed is:

1. A removable double-sided adhesive tab comprising:
   a tab body of substantially flat configuration, each side of which is divided into
   a coated portion coated by an adhesive composition and
   an uncoated portion,
   said tab is adapted to be removably fixed to a rigid supporting surface by means of one side and wherein the other side is provided to be stuck to a flexible display object,
   wherein said tab body is made of a material having a sufficient rigidity allowing said tab body to retain said flat configuration co-planar to said rigid supporting surface,
   said uncoated portion has at least one grip element,
   said grip element is provided to facilitate easy gripping an edge of said uncoated portion and lifting off said tab from said supporting surface, wherein a liftability effect is achieved no matter which side of the tab is placed against said supporting surface, wherein said grip element comprises a localized surface deformity which causes the uncoated portion of said tab body to be slightly out of plane surface in the vicinity of said grip element.

2. A removable double-sided adhesive tab according to claim 1, wherein the thickness of said tab body is between 0.002 and 0.02 inches.

3. A removable double-sided adhesive tab according to claim 2, wherein said tab is made of semi-rigid plastic material.

4. A removable double-sided adhesive tab according to claim 2, wherein said tab is made of a rigid plastic material.

5. A removable double-sided adhesive tab according to claim 1, wherein each of said coated portions is covered by a removable protective liner, and wherein said removable protective liner extends into said uncoated portion.

6. A removable double-sided adhesive tab according to claim 1, wherein the coated portion on one of said sides counter-opposes the coated portion of the other of said sides.

7. A removable double-sided adhesive tab according to claim 1, wherein the coated portion of one of said sides counter-opposes the uncoated portion of the other of said sides, and wherein each uncoated portion of said tab body is provided with the grip element.

8. A removable double-sided adhesive tab according to claim 1, wherein the coated portion covers most of the area of one of said sides.

9. A tab assembly comprising a combination of:
   a flexible display object removably fixed to
   a rigid supporting surface by means of
   double-sided adhesive tab comprising
   a tab body of substantially flat configuration each side of which is divided into
   a coated portion coated by an adhesive composition and
   an uncoated portion,
   said tab is adapted to be removably fixed to said rigid supporting surface by means of one side and wherein the other side is provided to be stuck to said flexible display object,
   wherein said tab body is made of a material having a sufficient rigidity allowing said tab body to retain said flat configuration co-planar to said rigid supporting surface,
   said uncoated portion has at least one grip element, wherein said grip element is provided to facilitate easy gripping an edge of said uncoated portion and lifting off said tab from said supporting surface, wherein a liftability effect is achieved no matter which side of the tab is placed against said supporting surface, wherein said grip element comprises a localized surface deformity which causes the uncoated portion of said tab body to be slightly out of plane surface in the vicinity of said grip element.

10. A tab assembly according to claim 9, wherein the thickness of said tab body is between 0.002 and 0.02 inches.

11. A tab assembly according to claim 10, wherein said tab is made of semi-rigid plastic material.

12. A tab assembly according to claim 10, wherein said tab is made of a rigid plastic material.

13. A tab assembly according to claim 9, wherein each of said coated portions is covered by a removable protective liner, and wherein said removable protective liner extends into said uncoated portion.

14. A tab assembly according to claim 9, wherein the coated portion on one of said sides counter-opposes the coated portion of the other of said sides.

15. A tab assembly according to claim 9, wherein the coated portion of one of said sides counter-opposes the uncoated portion of the other of said sides, and wherein each uncoated portion of said tab body is provided with the grip element.

16. A tab assembly according to claim 9, wherein the coated portion covers substantially most area of one of said sides.

17. A tab assembly according to claim 1, wherein said grip element is located at a distal end.

18. A tab assembly according to claim 1, wherein said grip element is located along a side edge of said tab body.

* * * * *